United States Patent
Frauenholz et al.

(10) Patent No.: US 9,658,092 B2
(45) Date of Patent: May 23, 2017

(54) AIR MASS FLOW METER

(75) Inventors: Rainer Frauenholz, Pettendorf (DE); Stephen Setescak, Pentling (DE)

(73) Assignee: Continental Automotive GmbH, Hannover (DE)

( * ) Notice: Subject to any disclaimer, the term of this patent is extended or adjusted under 35 U.S.C. 154(b) by 585 days.

(21) Appl. No.: 13/700,638

(22) PCT Filed: May 10, 2011

(86) PCT No.: PCT/EP2011/057511
§ 371 (c)(1),
(2), (4) Date: Nov. 28, 2012

(87) PCT Pub. No.: WO2011/147681
PCT Pub. Date: Dec. 1, 2011

(65) Prior Publication Data
US 2013/0061684 A1 Mar. 14, 2013

(30) Foreign Application Priority Data
May 28, 2010 (DE) .................. 10 2010 020 264

(51) Int. Cl.
*G01F 1/684* (2006.01)
*G01F 15/00* (2006.01)
(Continued)

(52) U.S. Cl.
CPC .......... *G01F 1/6845* (2013.01); *G01F 1/6842* (2013.01); *G01F 15/00* (2013.01); *G01F 15/12* (2013.01); *G01F 15/14* (2013.01)

(58) Field of Classification Search
CPC ......... G01F 15/12; G01F 15/125; G01F 1/106
(Continued)

(56) References Cited

U.S. PATENT DOCUMENTS 4,523,463 A * 6/1985 Fathauer et al. ........... 73/204.22
5,303,584 A * 4/1994 Ogasawara et al. ............ 73/198
(Continued)

FOREIGN PATENT DOCUMENTS

DE     38 38 466 A1    7/1989
DE     102 22 541 A1   11/2002
(Continued)

OTHER PUBLICATIONS

Full English Translation of JP 63218821 to Tanimoto et al. published Sep. 12, 1988.*
(Continued)

*Primary Examiner* — Lisa Caputo
*Assistant Examiner* — Philip Cotey
(74) *Attorney, Agent, or Firm* — Cozen O'Connor

(57) ABSTRACT

An air mass flow meter, includes a housing made of plastic having an electrically insulating effect. A flow channel is formed in the housing. The air mass flow motion also includes a sensor element which is arranged in the housing and detects the air mass flowing in the flow channel. Conductive paths are arranged in the housing and connect the sensor element to connection pins. In order to provide a mass air flow meter which is cost-effective to produce and allows precise measurement of a mass air flow, the entire housing is made of plastic and at least one part of the flow channel has electrostatically dissipative properties.

7 Claims, 5 Drawing Sheets

(51) Int. Cl.
*G01F 15/12* (2006.01)
*G01F 15/14* (2006.01)

(58) Field of Classification Search
USPC .............................. 73/861, 204.21, 204.22
See application file for complete search history.

(56) References Cited

U.S. PATENT DOCUMENTS

| | | | |
|---|---|---|---|
| 2002/0172789 A1 | 11/2002 | Watson et al. | |
| 2003/0087448 A1* | 5/2003 | Abe et al. | 436/73 |
| 2006/0100796 A1* | 5/2006 | Fraden et al. | 702/45 |
| 2006/0277990 A1* | 12/2006 | Saito et al. | 73/204.22 |
| 2007/0051237 A1* | 3/2007 | Furukawa et al. | 95/59 |
| 2007/0131279 A1 | 6/2007 | Thakre et al. | |
| 2007/0169548 A1* | 7/2007 | Kikawa et al. | 73/202.5 |
| 2007/0256493 A1* | 11/2007 | Okamoto et al. | 73/204.11 |
| 2007/0295068 A1* | 12/2007 | Kozawa et al. | 73/118.2 |
| 2008/0022766 A1* | 1/2008 | Saito et al. | 73/204.22 |
| 2008/0173099 A1* | 7/2008 | Ban | 73/861 |
| 2008/0184769 A1* | 8/2008 | McKinney | 73/204.25 |
| 2009/0126477 A1* | 5/2009 | Saito et al. | 73/204.25 |
| 2009/0158838 A1* | 6/2009 | Speldrich | 73/272 R |
| 2009/0211355 A1* | 8/2009 | Renninger et al. | 73/204.26 |
| 2010/0180675 A1* | 7/2010 | Schneider et al. | 73/114.31 |

FOREIGN PATENT DOCUMENTS

| | | |
|---|---|---|
| DE | 10 2005 057 575 A1 | 6/2007 |
| EP | 0 458 998 A1 | 12/1991 |
| JP | 63-218821 A | 9/1988 |
| JP | 63-243720 A | 10/1988 |
| JP | 2009-198248 A | 9/2009 |
| WO | WO 2008/006945 A1 | 1/2008 |

OTHER PUBLICATIONS

Office Action dated Feb. 20, 2017 which issued in the corresponding Korean Patent Application No. 10-2012-7034032.

* cited by examiner

AIR MASS FLOW METER

PRIORITY CLAIM

This is a U.S. national stage of International Application No. PCT/EP2011/057511, filed on 10 May 2011, which claims priority to German Application No. 10 2010 020 264.9, filed 28 May 2010, the contents of which are incorporated herein by reference in its entirety.

BACKGROUND OF THE INVENTION

1. Field of the Invention

The invention relates to an air mass flow meter having a housing made of plastic which has an electrically insulating effect, a flow channel being formed in the housing, and having a sensor element which is arranged in the housing and detects the air mass flowing in the flow channel, and conductor tracks which connect the sensor element to connection pins being arranged in the housing.

2. Description of the Related Art

In the context of this application, the term "air" is used as an example of a gas or gas mixture, the mass flow of which can be determined. In principle, the mass flow of any gas or gas mixture can be determined using the air mass flow meter according to the invention.

Such air mass flow meters are known and are used in large numbers, for example, in automobiles in order to detect the air mass flowing to an internal combustion engine. Depending on the air mass flow detected by the air mass flow meter, both diagnoses, for example of the operation of the internal combustion engine, and control of the internal combustion engine can be carried out. For these purposes, detection of the actual air mass flow, which is also reliable and as precise as possible under different operating conditions, is important.

European Published Patent Application EP 0 458 998 A1 discloses an air mass flow meter having a housing in which a flow channel is formed and in which a flow straightener is introduced upstream of a sensor element. The flow straightener comprises a honeycomb body and a ring which projects beyond the honeycombs in the direction of flow and in which a grating is embedded at a distance from the honeycombs, which grating generates microvortices.

SUMMARY OF THE INVENTION

An object of the present invention is to specify an air mass flow meter which can be produced in a cost-effective manner and makes it possible to measure an air mass flow in an accurate manner, the air mass flow meter being intended to operate without errors for as long as possible.

As a result of the entire housing consisting of plastic, and at least one part of the flow channel having electrostatically dissipative properties, the air mass flow meter can be produced in a particularly cost-effective manner, for example in an injection-molding method. Because at least one part of the flow channel has electrostatically dissipative properties, electrically charged dirt particles are discharged before they can reach the sensor element. An accumulation of electrically charged dirt particles on the sensor element is thus prevented. Since no dirt particles are deposited on the sensor element, it is possible to measure the air mass flowing in the tube in a precise and interference-free manner over the entire service life of the air mass flow meter. Regions whose sheet resistance is less than $10^{12}$ ohms are referred to as electrostatically dissipative. The sheet resistance is thus small enough to discharge electrostatically charged particles in the air mass and to protect the sensor element from the deposition of these particles.

Since the entire housing, including the flow channel having the part with electrostatically dissipative properties, consists of plastic, it is possible to achieve a particularly long service life of the sensor. No conductive regions which were applied to the flow channel and could possibly become detached again are situated in the flow channel. The flow channel forms, with its electrically dissipative part, a single-piece component made of plastic, the electrically dissipative region of the flow channel obtaining its electrically dissipative property as a result of conductive particles in the plastic.

In one embodiment, the sensor element is produced with a MEMS design. Particularly for air mass flow meters with sensor elements constructed using microsystem (MEMS) technology, it is particularly important to discharge charged dirt particles in a part of the flow channel with electrostatically dissipative properties. If charged dirt particles (for example charged dust particles) are present in the air flow, they are attracted by the charged surfaces of the sensor element and the charged dirt particles are deposited on these charged surfaces. However, discharge of the dirt particles is prevented by the highly insulating passivation layer on the charged surfaces of the sensor element. In order to prevent this, the charged dirt particles are discharged in the electrostatically dissipative part of the flow channel before reaching the sensor element constructed using microsystem (MEMS) technology, as a result of which they can no longer be deposited on the surface of the sensor element.

In a next development, the electrically dissipative part of the flow channel consists of plastic with conductive polymers and/or of plastic with conductive fibers and/or of plastic with conductive carbon black. Carbon or metal particles, for example, are suitable as conductive fibers in the plastic. Plastic with conductive components (polymers, fibers and/or conductive carbon black) can be integrated in the flow channel in a cost-effective and simple manner.

If the electrically dissipative part of the flow channel is electrically connected to a fixed potential, the charge carriers can be easily discharged from the dirt particles and the dirt particles are thus neutralized in a simple manner. These particles are thus no longer deposited on the sensor element.

In one preferred embodiment, the fixed potential is the sensor ground. The sensor ground is the neutral reference potential for the air mass flow meter and is able to absorb large quantities of charge carriers without being subject to a potential shift.

If the housing has a housing body and a housing cover, it is particularly easy to produce the air mass flow meter. In this case, the electrically dissipative part of the flow channel may be formed in and/or on the housing body and/or in and/or on the housing cover.

DETAILED DESCRIPTION OF THE PREFERRED EMBODIMENTS

Figure 1:
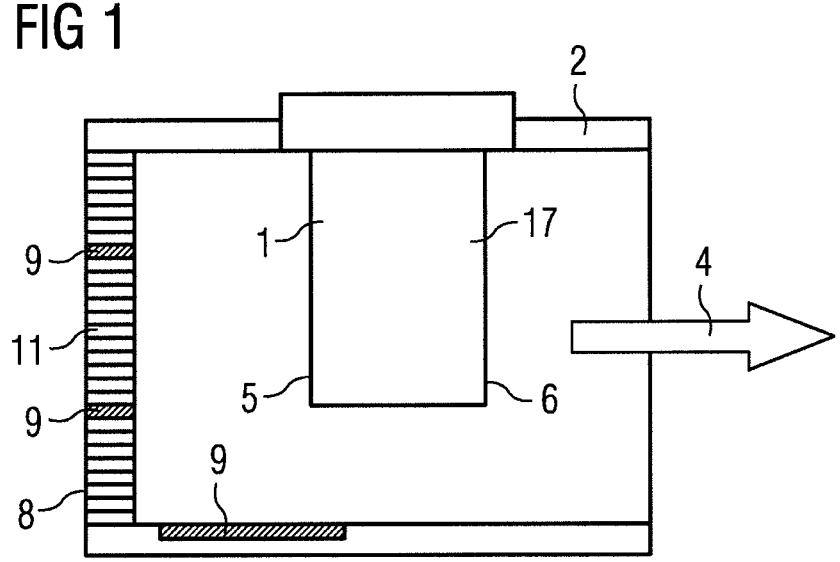
FIG. 1 shows an air mass flow meter in a tube.

FIG. 1 shows an air mass flow meter 1. The air mass flow meter 1 is arranged in a tube 2. The air mass flow meter 1 has a housing 17 with a start 5 and an end 6 with respect to the main direction of flow 4 of the air mass in the tube 2. In order to be able to measure across all flow velocities of the air mass in the tube 2 in an error-free manner, a flow guiding element 8 is formed upstream of the air mass flow meter 1 at a certain distance from the start 5 of the latter. This flow guiding element 8 consists of a grating 11 in this case. Both the tube 2 and the grating 11 may have regions 9 with electrically dissipative properties.

Figure 2:
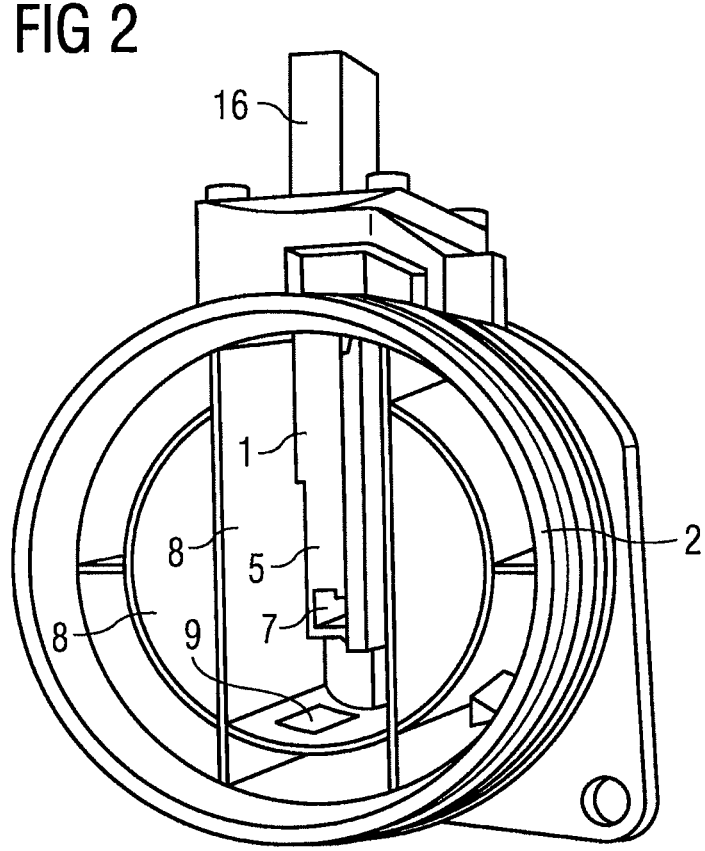
FIG. 2 shows a perspective view of the air mass flow meter.

FIG. 2 shows a perspective view of the air mass flow meter 1 in a tube 2. The air mass flow meter 1 has a flow channel 7 which receives part of the air flowing in the tube 2 and guides it via a sensor element 3. Extended flow guiding elements 8 which are oriented parallel to the main direction of flow 4 are arranged in the tube 2 of the air mass flow meter 1. These flow guiding elements 8 may also have regions 9 with electrically dissipative properties. FIG. 2 also shows a connection element 16 in which the connection pins are arranged, which pins electrically connect the sensor element 3 and its downstream electronic circuit 10 to an electronic engine controller, for example.

Figure 3:
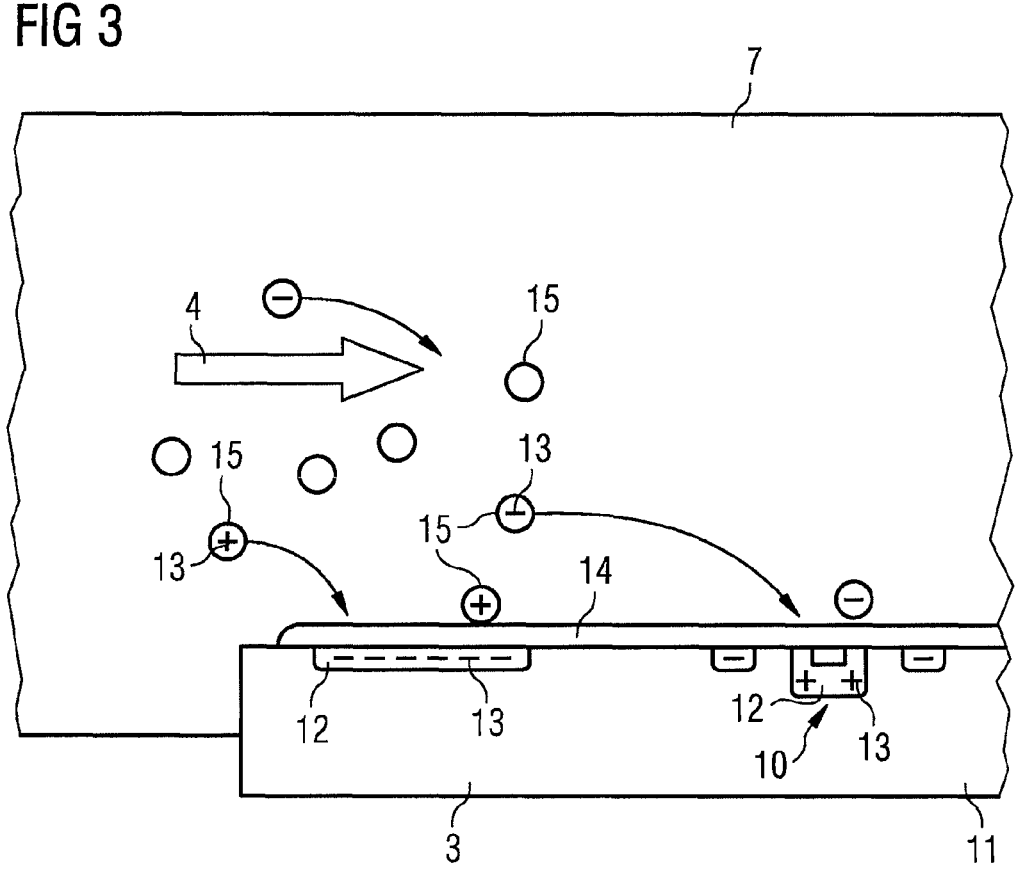
FIG. 3 schematically shows a sensor element produced using MEMS technology.

FIG. 3 schematically shows a sensor element 3 produced using MEMS technology in the air flow 4. Modern sensor elements 3 constructed using microsystem (MEMS) technology detect the air mass flow very quickly and measure virtually every change in the air mass flow 4 with a high degree of precision. The sensor element 3 and the electronic circuit 10 for processing the signals from the sensor element 3 may be formed on a single semiconductor component 11 using microsystem technology (MEMS). One disadvantage of the sensor elements 3 produced using microsystem technology is that a thin but highly insulating passivation layer 14, for example made of silicon dioxide, is generally arranged above the electrically conductive surfaces 12 of the sensor element 3 which are charged with charge carriers 13. If charged dirt particles 15 (for example charged dust particles) are present in the air flow 4, these are attracted by the charged surfaces 12 of the sensor element 3 and the charged dirt particles 15 are deposited on these charged surfaces 12. However, discharge of the dirt particles 15 is prevented by the highly insulating passivation layer 14 on the charged surfaces 12 of the sensor element 3. The charged dirt particles 15 are literally trapped on the electrically conductive surface 12 of the sensor element 3, and this contamination distorts the measurement of the air mass 4 flowing past.

Figure 4:
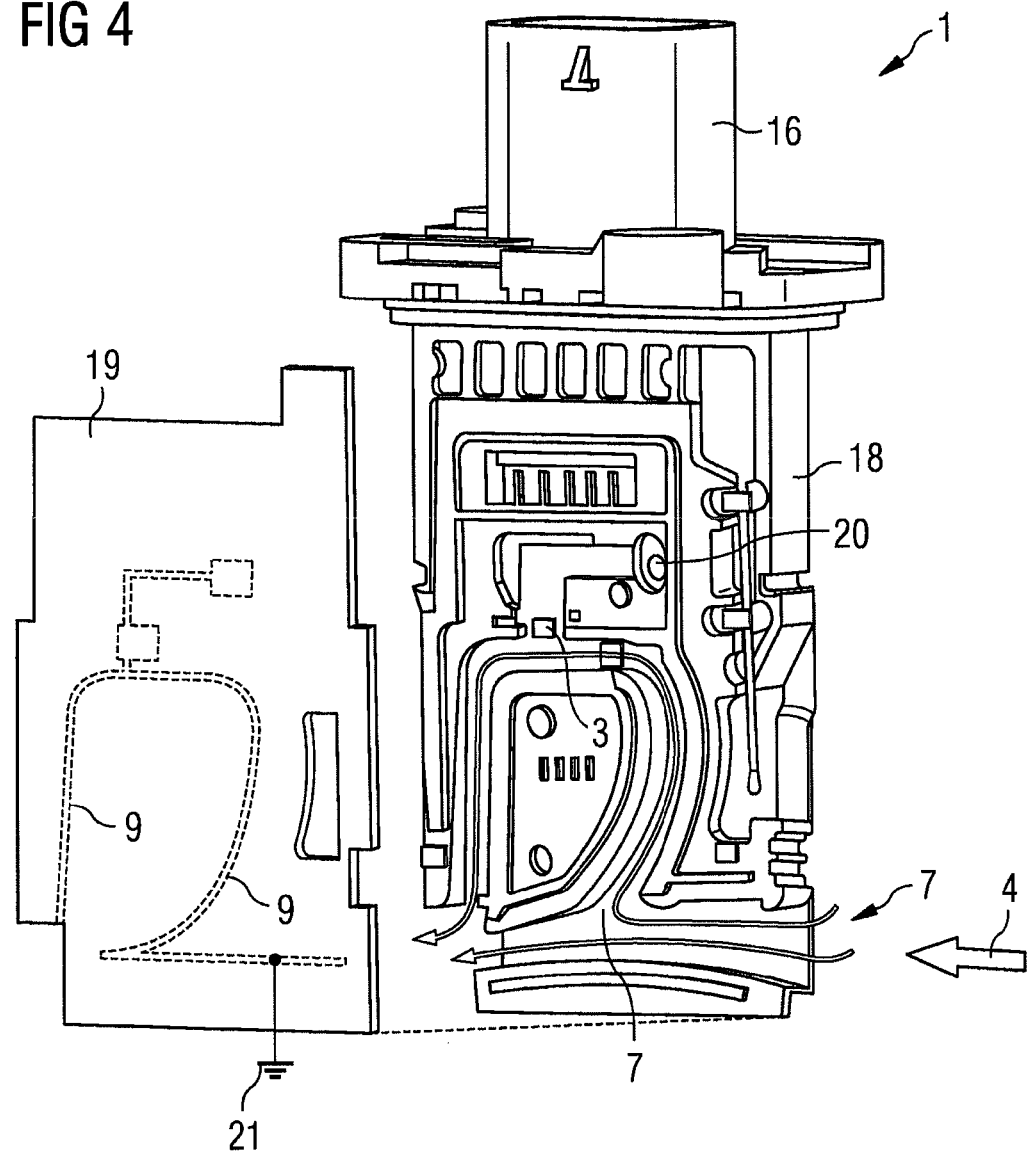
FIG. 4 shows an air mass flow meter having a housing.

FIG. 4 shows an air mass flow meter 1 having a housing 17. The housing 17 consists of a housing body 18 and a housing cover 19. The connection element 16 in which electrically conductive pins are accommodated can be seen on the housing body 18. The pins establish electrical contact between the sensor element 3 and downstream electronics, for example an engine controller. The flow channel 7 can also be seen in the housing body 18. In this case, the flow channel 7 has an Ω-shaped construction. However, this is only one example of a flow channel. There are various configurations for such flow channels in air mass flow meters 1. The housing cover 19 may be connected to the housing body 18. This may be effected, for example, by adhesive bonding or laser welding. A region 9 with electrically dissipative properties can be seen in the housing cover 19. This region 9 with electrically dissipative properties largely covers the flow channel 7. Dirt particles 15 present in the air flow 4 with charge carriers 13 can thus be discharged by means of contact with the region 9 with electrically dissipative properties. This ensures that only electrostatically neutral dirt particles 15 flow past the sensor element 3 with the air mass 4. The regions 9 with electrostatically dissipative properties prevent, in a highly effective manner, electrically charged dirt particles 15 from being deposited on the sensor element 3. The reference symbol 20 is used to denote the ground connection which is used to connect the region 9 with electrically dissipative properties to the sensor ground 21 or to another fixed potential. The connection to the sensor ground 21 is schematically attached to the region 9 with electrically dissipative properties in FIG. 4.

Figure 5:
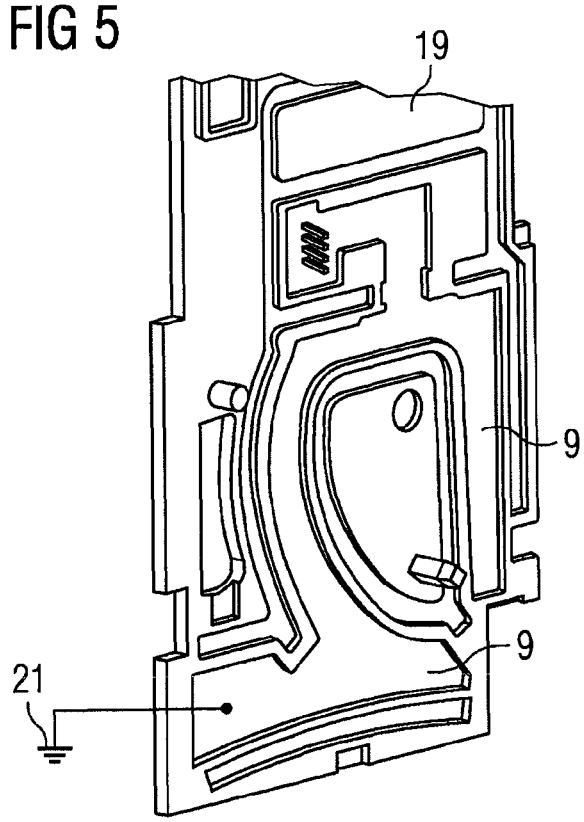
FIG. 5 shows a housing cover.

FIG. 5 shows a more detailed illustration of the housing cover 19. The region 9 with electrically dissipative properties can be easily seen in the housing cover 19. In this case, the shape of the region 9 with electrically dissipative properties largely corresponds to the shape of the flow channel 7. The air mass 4 flows along the region 9 with electrically dissipative properties, dirt particles 15 contained in the air mass being able to be discharged at the region 9 with electrically dissipative properties. The connection to the sensor ground 21 is schematically attached to the region 9 with electrically dissipative properties in FIGS. 5 and 6.

Figure 6:
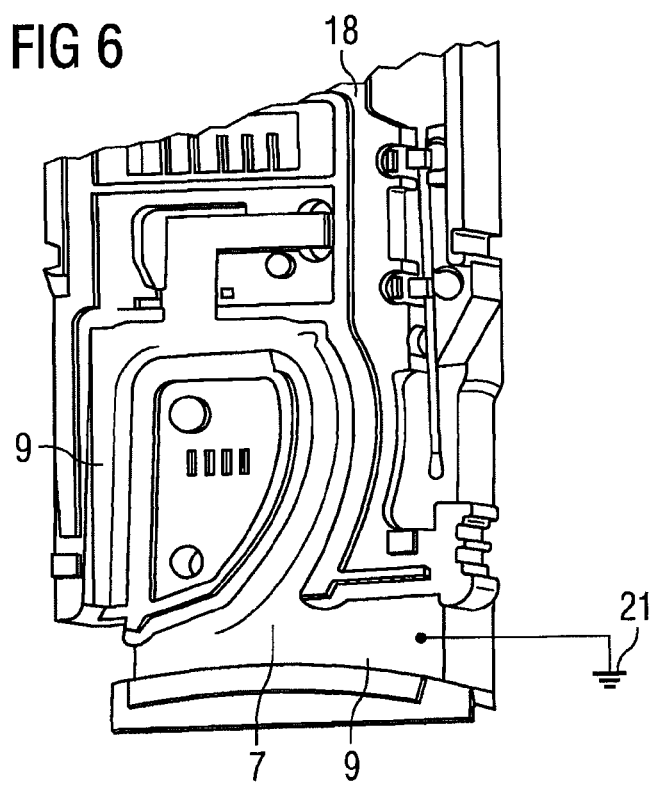
FIG. 6 shows a housing body.

FIG. 6 shows the housing body 18. The flow channel 7 can be seen in the housing body 18; in this exemplary embodiment, the flow channel 7 is also provided with a region 9 with electrically dissipative properties.

Figure 7:
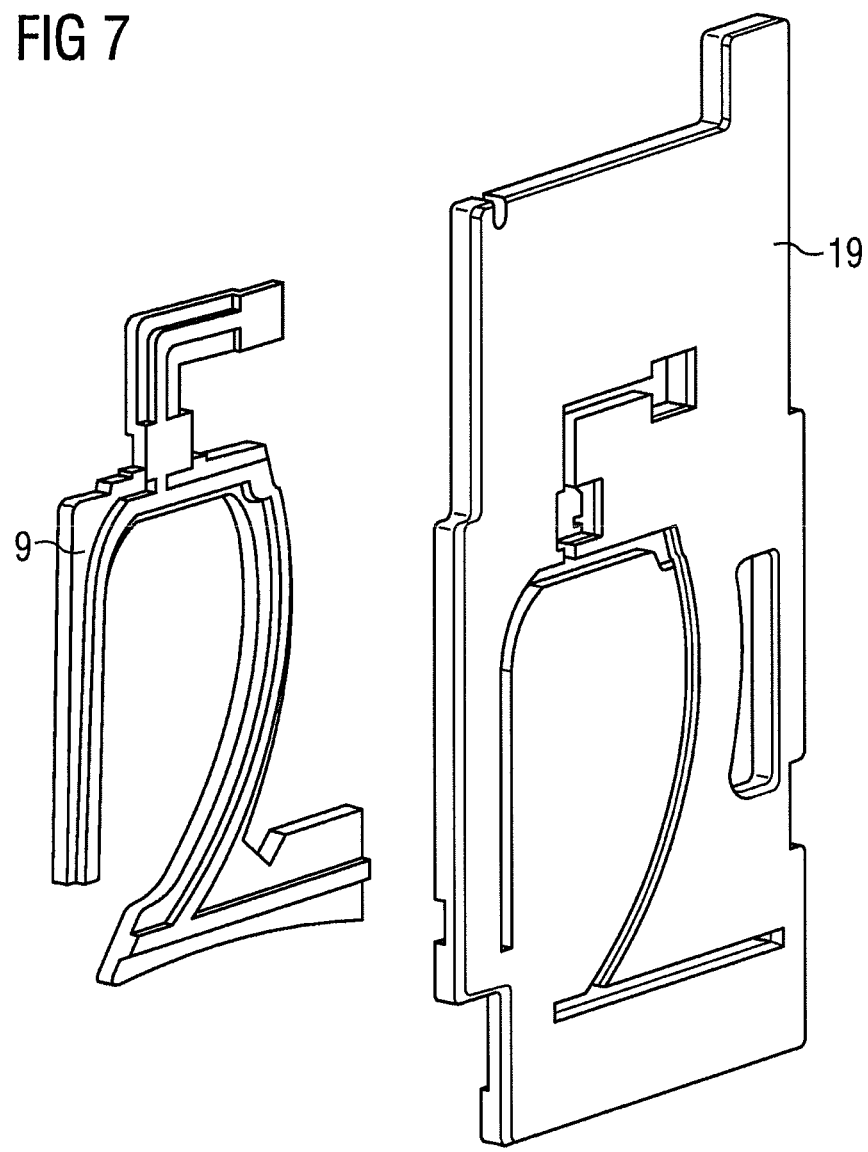
FIG. 7 shows a housing cover again.

FIG. 7 shows the housing cover 19 and the region 9 with electrically dissipative properties again. It is possible to see the housing cover 19 before the region 9 with electrically dissipative properties is integrated in the latter. In order to integrate the region 9 with electrically dissipative properties, the region 9 with the electrically dissipative properties is fitted into the housing cover 19 and is adhesively bonded to the housing cover or is connected to the latter by means of laser welding, for example.

The region 9 with electrically dissipative properties consists of a plastic containing electrically conductive particles. These electrically conductive particles may be, for example, carbon particles or fine iron filings.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An air mass flow meter, comprising:
a housing made of a plastic which has an electrically insulating effect;
a flow channel formed in the housing;
a sensor element having a MEMS design arranged in the housing and for detecting an air mass flowing in the flow channel; and
conductor tracks which connect the sensor element to connection pins arranged in the housing, wherein:
an entirety of the housing is formed from the plastic, and
at least one region of the flow channel is an electrically dissipative region having an electrostatically dissipative property.

2. The air mass flow meter as claimed in claim 1, wherein the electrically dissipative region of the flow channel includes at least one of a plastic with a conductive polymer, a plastic with a conductive fiber, and a plastic with a conductive carbon black.

3. The air mass flow meter as claimed in claim 1, wherein the electrically dissipative region of the flow channel is electrically connected to a fixed potential.

4. The air mass flow meter as claimed in claim 3, herein the fixed potential is a sensor ground.

5. The air mass flow meter as claimed in claim 1, wherein the housing has a housing body and a housing cover.

6. The air mass flow meter as claimed in claim 5, wherein the electrically dissipative region of the flow channel is at least one of formed in and formed on the housing body.

7. The air mass flow meter as claimed in claim 5, wherein the electrically dissipative region of the flow channel is at least one of formed in and formed on the housing cover.

* * * * *